UNITED STATES PATENT OFFICE.

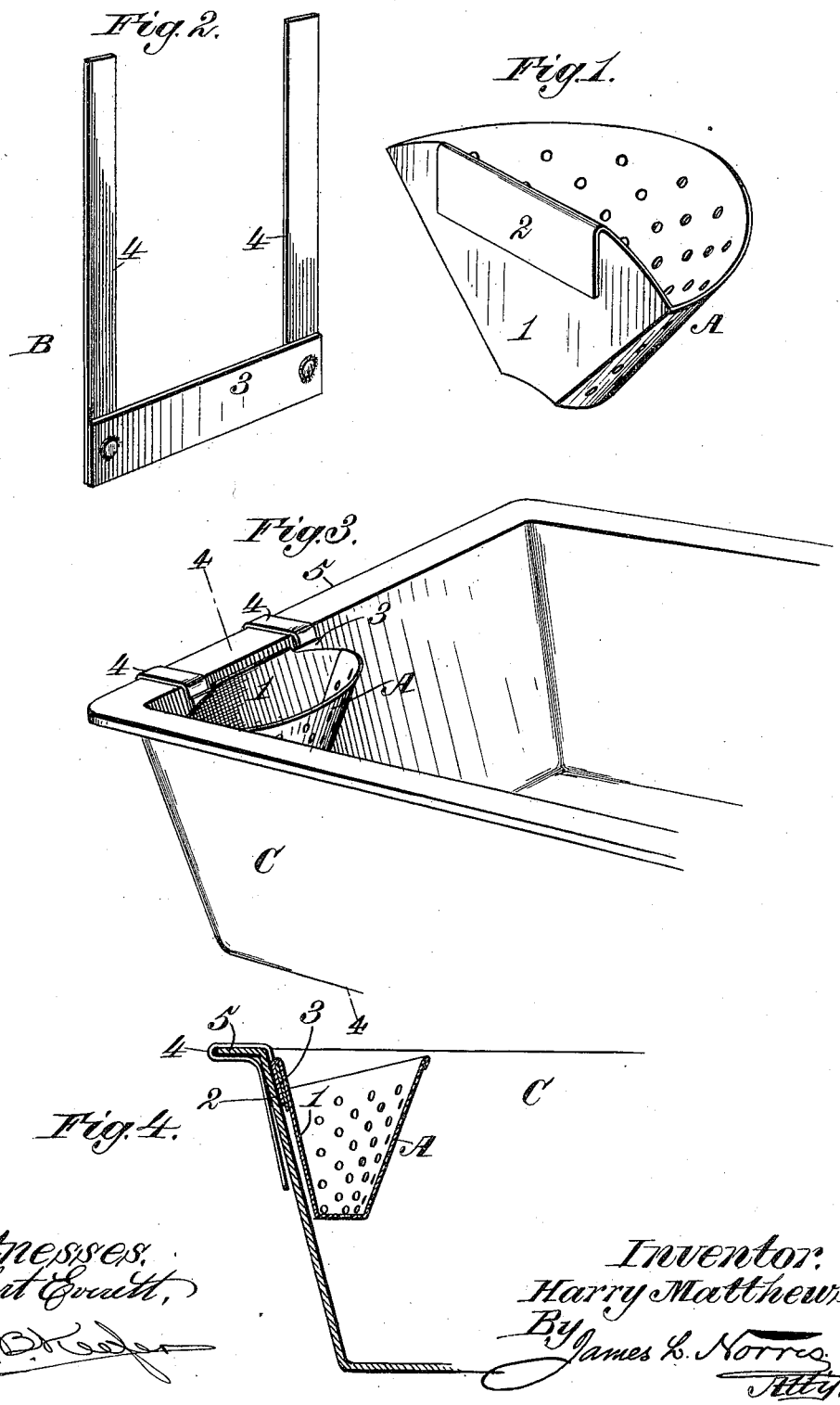

HARRY MATTHEWS, OF CLEVELAND, OHIO.

SINK-STRAINER.

981,448.

Specification of Letters Patent.   Patented Jan. 10, 1911.

Application filed November 5, 1909.  Serial No. 526,399.

*To all whom it may concern:*

Be it known that I, HARRY MATTHEWS, a citizen of the United States, residing at Cleveland, in the county of Cuyahoga and State of Ohio, have invented new and useful Improvements in Sink-Strainers, of which the following is a specification.

The present invention is an improvement in sink-strainers, and its object comprehends the production of an article of the type specified provided with a clip by means of which it may be readily suspended from any part of the rim or edge of the sink, the clip itself being completely detachable from the strainer body so as to permit the latter to be removed without necessitating the removal of the clip.

A practical embodiment of the invention is illustrated in the accompanying drawing wherein—

Figure 1 is a perspective view of the strainer body. Fig. 2 is a similar view of the clip. Fig. 3 is a perspective view showing the strainer attached to a sink. Fig. 4 is a fragmental vertical sectional view taken on the line 4—4 of Fig. 3.

Reference being had to said drawings, and to the characters marked thereon, A designates in a general manner the body portion of the strainer, B the clip attached thereto, and C the sink, the last-mentioned element being of any preferred or ordinary construction and hence requiring no extended description.

The strainer body, a strainer proper, is constructed in the usual manner of perforated sheet metal and is of approximately frusto-conical formation, its rear side or wall 1 being flat, as shown. The upper edge of the afore-mentioned wall is formed with an extension which is bent downwardly parallel with said wall, thereby providing a lip, indicated by the numeral 2. This lip is designed to engage the horizontal base member 3 of clip B, said clip having the general shape of the letter U. The clip legs 4 are preferably fastened to the ends of base 3 and are constructed of any suitable flexible metal in order that they may be bent around the rim 5 of the sink. Both legs are flat, as shown, and the distance between their inner longitudinal edges is very little greater than the width of the lip; consequently, when the latter is engaged with the clip base, the strainer body will be held against movement thereon, as will be apparent.

By reason of the construction above described, it will be seen that the strainer body may be readily attached to the clip by merely hooking its depending lip over the clip base, after which the clip legs may be bent around and under the sink rim, no further means being required to retain the device as a whole in place. When the parts are in this position, the lip is in effect straddled by the clip, from which it is suspended. Finally, it is apparent that the device may be shifted along the sides of the sink rim into any desired position without necessitating the unloosening of the clip, nor is such unloosening necessary when the detachment of the strainer body is desired, since that object may be attained by merely raising the strainer body sufficiently to disengage its lip from the clip base.

Further description of the invention is considered unnecessary in view of the foregoing.

What is claimed is:

1. A sink strainer comprising, in combination, a body having a flat rear wall formed at its upper edge with a depending lip arranged parallel therewith; and a U-shaped clip for supporting said body consisting of a flat base member adapted for removable interposition between said rear wall and lip, whereby said body is held against rocking movement, and a pair of flexible legs connected to the ends of said member and adapted to be folded about the rim of the sink, to permit the attachment of the strainer to rims of different widths and its adjustment longitudinally of the same.

2. A sink strainer comprising a body provided with a lip; and a support therefor consisting of a base member adapted for detachable engagement by said lip, and a pair of flexible legs connected to the ends of said member and adapted to be folded about the rim of the sink, to permit the attachment of the strainer to rims of various widths and its adjustment longitudinally of the same, the distance between the inner longitudinal edges of said legs being approximately equal to the width of said lip, to prevent movement of said strainer along said member.

In testimony whereof I have hereunto set my hand in presence of two subscribing witnesses.

HARRY MATTHEWS.

Witnesses:
 JOSEPH LAROUGE,
 FLORENCE E. BIRD.